(No Model.)
J. H. CROSKEY & J. LOCKE.
GLASS FOR SKYLIGHTS, &c.
No. 524,936. Patented Aug. 21, 1894.
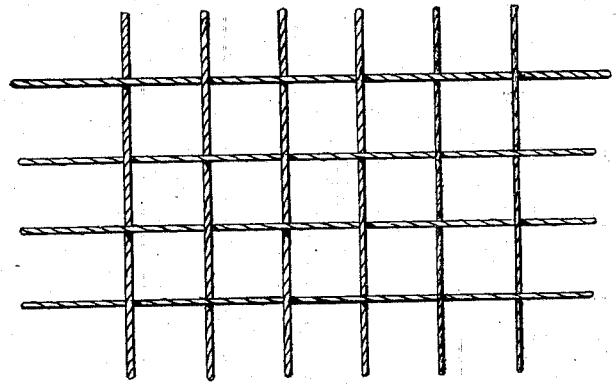
Fig. 1.
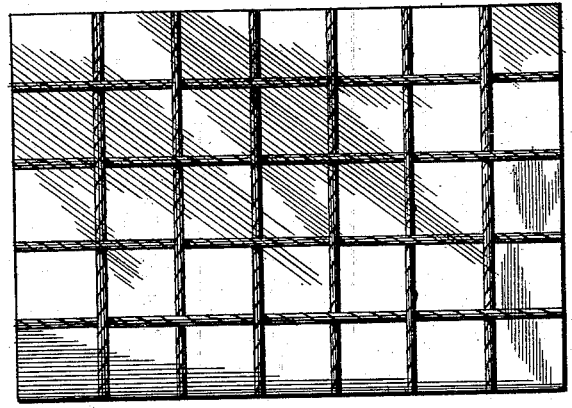
Fig. 2.
Fig. 3.
Fig. 4.
Fig. 5.  Fig. 6.
Witnesses
J. M. Wilson
G. M. Copenhaver.
INVENTORS
John H. Croskey
Joseph Locke
By Connolly Bros
Attys

UNITED STATES PATENT OFFICE.

JOHN H. CROSKEY AND JOSEPH LOCKE, OF PITTSBURG, PENNSYLVANIA.

GLASS FOR SKYLIGHTS, &c.

SPECIFICATION forming part of Letters Patent No. 524,936, dated August 21, 1894.

Application filed March 20, 1894. Serial No. 504,453. (No model.)

*To all whom it may concern:*

Be it known that we, JOHN H. CROSKEY and JOSEPH LOCKE, citizens of the United States, residing at Pittsburg, in the county of Allegheny and State of Pennsylvania, have invented certain new and useful Improvements in Glass for Skylights, &c.; and we do hereby declare the following to be a full, clear, and exact description of the invention, such as will enable others skilled in the art to which it appertains to make and use the same.

This invention has relation to the manufacture of sheet or plate glass for windows, skylights, screens and other purposes, and has for its object the production of a compound sheet or plate having the properties and advantages of what is known as "wire glass," *i. e.*, glass having strands of wire embedded therein so as to give strength to the glass and protect the wire from the action of the atmosphere, and having also certain advantages not possessed by wire glass now in use.

Our invention pertains to the use in connection with the wire, of a non-metallic substance of high refractory or incombustible properties, such as asbestos, which will adhere better to the glass in which it is embedded, than will metallic wire, and which will be less liable than the latter to crack the glass through inequality of expansion and contraction.

Our invention contemplates the use of the asbestos or its equivalent, as a covering to fine metallic wire, the asbestos in such case being the material in direct contact with the glass.

In carrying our invention into effect we weave the strands of fine wire wrapped with asbestos, into a sheet or net of any desired dimensions, and lay the sheet or net flat upon a heated table or other support. We then pour the glass onto this sheet, and by means of a suitable roller or rollers roll and press the molten glass through the interstices of the sheet or net. By using in the first instance a table or support having its surface recessed to coincide with the interstices in the gauze or net, the glass may in the first rolling, be pressed through and below the fabric and the latter being then reversed and laid upon a flat surface the projections may be rolled down upon the exposed strands so as to obliterate the projections and completely embed the gauze or fabric in the glass. Any other method adapted for embedding a metallic fabric or series of wires in glass, may be adopted.

In the accompanying drawings: Figure 1 is a plan view of a piece or strip of the gauze or fabric, adapted for the purposes of our invention. Fig. 2 is a plan view illustrating a sheet of glass having the gauze or fabric embedded therein. Fig. 3 is a longitudinal sectional view of the same. Fig. 4 is a vertical longitudinal sectional view of a glass rolling table. Figs. 5 and 6 are sectional views respectively of a piece of asbestos cord, and of asbestos-wrapped wire.

When the asbestos is applied to the wire as a covering it may be wrapped or wound thereon, or otherwise applied according to any of the methods employed in insulating electrical conducting wire by wrapping with fibrous material.

Having described our invention, we claim—

1. As a new manufacture, glass having embedded in it strings or cords of incombustible mineral with metallic cores, substantially as described.

2. As a new article of manufacture, a plate glass having embedded in it metallic wires covered with asbestos.

In testimony whereof we affix our signatures in presence of two witnesses.

JOHN H. CROSKEY.
JOSEPH LOCKE.

Witnesses:
C. E. SUCCOP,
JAMES SHERRAN.